US011890954B1

(12) United States Patent
Nguyen et al.

(10) Patent No.: US 11,890,954 B1
(45) Date of Patent: Feb. 6, 2024

(54) MULTI-FUNCTION ONBOARD BATTERY CHARGER MODULE

(71) Applicant: GM GLOBAL TECHNOLOGY OPERATIONS LLC, Detroit, MI (US)

(72) Inventors: Minh-Khai Nguyen, Troy, MI (US); Sanjeev M. Naik, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/949,600

(22) Filed: Sep. 21, 2022

(51) Int. Cl.

| | |
|---|---|
| ***B60L 53/20*** | (2019.01) |
| ***H02J 7/00*** | (2006.01) |
| ***H02M 3/335*** | (2006.01) |
| ***H02M 7/219*** | (2006.01) |

(52) U.S. Cl.
CPC ............ *B60L 53/20* (2019.02); *H02J 7/0063* (2013.01); *H02J 7/007182* (2020.01); *H02M 3/33573* (2021.05); *H02M 7/219* (2013.01); *B60L 2210/30* (2013.01); *B60L 2210/40* (2013.01); *H02J 2207/20* (2020.01)

(58) Field of Classification Search
CPC .. B60L 53/20; B60L 2210/30; B60L 2210/40; H02J 7/007182; H02J 7/0063; H02J 2207/20; H02M 3/33573; H02M 7/219
See application file for complete search history.

(56) References Cited

U.S. PATENT DOCUMENTS

2013/0038273 A1* 2/2013 Riggio .................... B60L 53/22 320/107

* cited by examiner

*Primary Examiner* — Carlos Amaya
(74) *Attorney, Agent, or Firm* — Quinn IP Law

(57) ABSTRACT

A multi-function onboard charging module (OBCM) operable for charging a battery pack using a wide variety of offboard charging systems, such as to enable the OBCM to charge a battery pack using electrical power provided from different types of direct current (DC), single-phase alternating current (AC), and/or three-phase AC offboard charging systems.

20 Claims, 3 Drawing Sheets

110
16
90
88
78
80
98
100
102
96
82
84
76
70
64
60
104
56
54
52
114
116
146
140
142
144
36
38
118
120
122
124

MULTI-FUNCTION ONBOARD BATTERY CHARGER MODULE

INTRODUCTION

The present disclosure relates to multi-function battery charger modules, such as but not necessarily limited to a multi-function onboard charger module (OBCM) operable to facilitate electrically charging a battery pack or other rechargeable energy storage system (RESS) operable to provide electrical power for operation of an electric vehicle.

An electric vehicle may be considered as a class of vehicle reliant on a battery pack to provide a supply of electrical power to a motor, with the motor then converting the electrical power to mechanical power, typically for use with a propulsion system configured to drive the electric vehicle. Certain electric vehicles include fuel cells, generators, and/or other types of onboard regenerative charging systems and devices to facilitate charging the battery pack while the vehicle is being driven. Some electric vehicles, however, may lack such onboard regenerative charging devices and/or vehicle operators may prefer charging the battery pack without relying on onboard regenerative devices, e.g., it may be more cost effective or quicker to charge the battery pack using offboard charging systems or it may be a necessity due to the onboard regenerative charging system being out of fuel or otherwise unable to meet battery pack charging demands.

Recognizing the need to provide offboard charging, a wide variety of vendors, utility providers, etc. have developed a broad variety of offboard charging systems. The variety of offboard charging systems can be problematic, at least in so far as certain types of electric vehicles may be incompatible with specific types of offboard charging systems, e.g., some electric vehicles may be incompatible with particular types of direct current (DC), single-phase alternating current (AC), and/or three-phase AC offboard charging systems.

SUMMARY

One non-limiting aspect of the present disclosure relates to a multi-function onboard charging module (OBCM) operable for charging a battery pack using a wide variety of offboard charging systems, such as to enable the OBCM to charge a battery pack using electrical power provided from different types of direct current (DC), single-phase alternating current (AC), and/or three-phase AC offboard charging systems.

One non-limiting aspect of the present disclosure relates to a multi-function onboard battery charger module (OBCM) for charging a battery pack with electrical power sourced from a plurality of offboard charging systems. The battery pack may be configured to provide electrical power to a motor of an electric vehicle, optionally with the motor converting the electrical power to mechanical power used to drive the electric vehicle. The OBCM may include a boost converter operable to boost a charging input to a boosted output operable for charging the battery pack and an isolation converter operable to electrically isolate the boost converter from the battery pack and to transform the boosted output to an isolated output operable for charging the battery pack. The OBCM may further include an output filter operable to mitigate noise within one of the boosted output and the isolated output, optionally with a filter output of the output filter interfacing the one of the boosted output and the isolated output with the battery pack. The OBCM may yet further include an isolation bypass circuit operable between an isolation bypass state and an isolation connect state, with the isolation bypass state connecting the boosted output to a filter input of the output filter in bypass of the isolation converter and the isolation connect state connecting the boosted output to an isolation input of the isolation converter. The OBCM may still further include a battery bypass circuit operable between a battery connect state and a battery disconnect state, with the battery connect state connecting the charging input through a direct connection to the battery pack in bypass of the boost and isolation converters and the battery disconnect state disconnecting the direct connection.

The boost converter may be operable to generate the boosted output as a high voltage direct current (DC) output when the charging input is either of a lower voltage DC input lower than the high voltage DC output, a single-phase alternating current (AC) input, and a three-phase AC input. The boost converter may be configured to generate the high voltage DC output at 800V when the lower voltage DC input is 400V, the single-phase AC input is between and the three-phase AC input is between 170-265V.

The isolation bypass circuit may include a relay within an isolation connection between the boosted output and the filter input, with the isolation bypass state occurring when the relay is in a closed state and the isolation connect state occurring when the relay is in an opened state.

The battery bypass circuit may include a relay in between a connection input and a connection output of the direct connection, with the battery connect state occurring when the relay is in a closed state and the battery disconnect state occurring when the relay is in an opened state.

The boost converter may include a plurality of switches and any plurality of inductors arranged in a multi-phase, totem-pole power factor correction (PFC) configuration. A pulse width modulation (PWM) controller may be operable to set a switching frequency and a duty cycle for each of the switches to control boosting of the charging input to the boosted output.

The isolation converter includes a plurality of switches and any plurality of inductors arranged in a CLLLC converter configuration. A pulse width modulation (PWM) controller may be operable to set a switching frequency and a duty cycle for each of the switches to control transforming of the boosted output to the isolated output.

The OBCM may include an input filter operable to mitigate noise within the charging input, with a filter output of the input filter interfacing the charging input with the boost converter.

The OBCM may include an electrical connector configured to electrically interface the input filter and the bypass circuit with the offboard charging systems. The electrical connector may include a direct current (DC) connection configured for electrically connecting to a direct current (DC) charging system of the offboard charging systems. The electrical connector may include an alternating current (AC) connection configured for electrically connecting to a single-phase AC charging system and a three-phase AC charging system of the offboard charging systems. The AC connection may include a plurality of electrical inputs and a plurality of switches, with the switches being individually operable between opened and closed positions to selectively connect the inputs to the input filter depending on whether the AC connection electrically connects with the single-phase AC charging system or the three-phase AC charging system.

One non-limiting aspect of the present disclosure relates to a multi-function onboard battery charger module (OBCM) for charging a battery pack with electrical power sourced from a plurality of offboard charging systems. The OBCM may include an electrical connector having a direct current (DC) connection configured for electrically connecting to a direct current (DC) charging system of the offboard charging systems and an alternating current (AC) connection configured for electrically connecting to a single-phase AC charging system and a three-phase AC charging system of the offboard charging systems. The OBCM may additionally include a boost converter operable to boost a charging input to a boosted output operable for charging the battery pack and an isolation converter operable to electrically isolate the boost converter from the battery pack and to transform the boosted output to an isolated output operable for charging the battery pack. The OBCM may further include an output filter operable to mitigate noise within one of the boosted output and the isolated output, with a filter output of the output filter interfacing the one of the boosted output and the isolated output with the battery pack. The OBCM may yet further include an isolation bypass circuit operable between an isolation bypass state and an isolation connect state, with the isolation bypass state connecting the boosted output to a filter input of the output filter in bypass of the isolation converter and the isolation connect state connecting the boosted output to an isolation input of the isolation converter. The OBCM may still further include a battery bypass circuit operable between a battery connect state and a battery disconnect state, with the battery connect state connecting the charging input through a direct connection to the battery pack in bypass of the boost and isolation converters and the battery disconnect state disconnecting the direct connection.

The AC connection may include a plurality of electrical inputs and a plurality of switches, the switches being individually operable between opened and closed positions to selectively connect the inputs to the charging input depending on whether the AC connection electrically connects with the single-phase AC charging system or the three-phase AC charging system.

The boost converter may include a plurality of switches and any plurality of boost inductors arranged in a multiphase, totem-pole power factor correction (PFC) configuration. The isolation converter may include a plurality of switches and any plurality of inductors arranged in a CLLLC converter configuration. A pulse width modulation (PWM) controller may be operable to set a switching frequency and a duty cycle for each of the switches of the boost and isolation converters to control boosting and transforming of the charging input.

One non-limiting aspect of the present disclosure relates to a multi-function onboard battery charger module (OBCM) comprising. The OBCM may include a boost converter operable to boost a charging input to a boosted output, an isolation converter operable to electrically isolate the boost converter from the battery pack and to transform the boosted output to an isolated output, and an output filter operable to mitigate noise within an output resulting from one of the boosted output and the isolated output. The OBCM may additionally include an isolation bypass circuit operable between an isolation bypass state and an isolation connect state, with the isolation bypass state connecting the boosted output to a filter input of the output filter in bypass of the isolation converter and the isolation connect state connecting the boosted output to an isolation input of the isolation converter. The OBCM may further include a battery bypass circuit operable between a connect state and a disconnect state, with the battery connect state connecting the charging input through a direct connection to the output in bypass of the boost and isolation converters and the disconnect state disconnecting the direct connection.

The boost converter may be operable to generate the boosted output as a high voltage direct current (DC) output when the charging input is either of a lower voltage DC input lower than the high voltage DC output, a single-phase alternating current (AC) input, and a three-phase AC input. The boost converter may be configured to generate the high voltage DC output at 800V when the lower voltage DC input is 400V, the single-phase AC input is between and the three-phase AC input is between 170-265V.

The above features and advantages along with other features and advantages of the present teachings are readily apparent from the following detailed description of the modes for carrying out the present teachings when taken in connection with the accompanying drawings. It should be understood that even though the following Figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
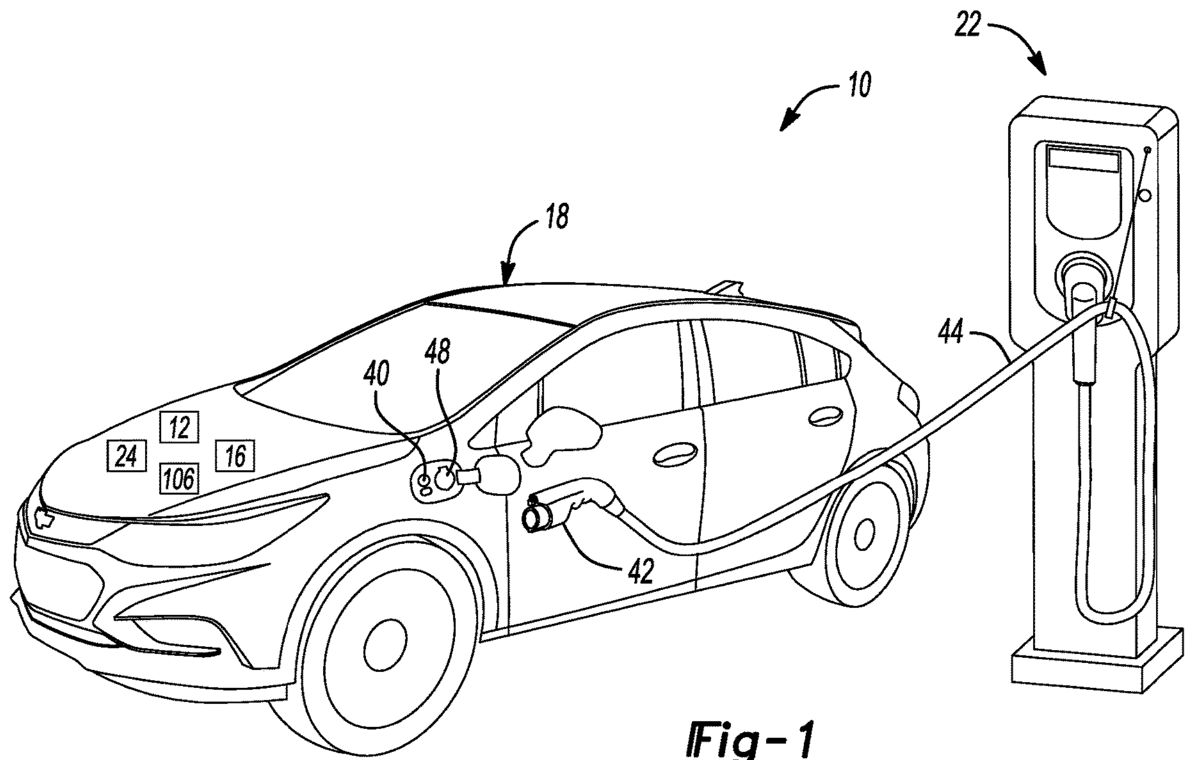
FIG. 1 illustrates a charging system having an onboard charger module (OBCM) in accordance with one non-limiting aspect of the present disclosure.

FIG. 1 illustrates a charging system 10 in accordance with one non-limiting aspect of the present disclosure. The charging system 10 is predominately described with respect to including a multi-function onboard charging module (OBCM) 12 for charging a battery pack 16 included within an electric vehicle 18 using electrical power provided from a plurality of different types of offboard charging systems 22. The described use of the OBCM 12 in charging the battery pack 16 is presented for exemplary and non-limiting purposes as the present disclosure fully contemplates the OBCM 12 being operable to facilitate charging other rechargeable energy storage systems (RESS), including those included within other types of automobiles, vehicles, devices, etc. The system 10 illustrates a singular offboard charging system 22 for the sake of presentation simplicity, as the illustrated offboard charging system 22 is intended to represent a plurality of different types of offboard charging systems available to facilitate charging the battery pack 16. The illustrated offboard charging system 22 is representative of those typically found at charging stations, homes, utilities, electrical grids, and other locations where the electric vehicle 18 may arrive for charging, which may be collectively referred to as electric vehicle supply equipment (EVSE) or commercial/residential electric vehicle 18 charging stations (EVCS).

The electric vehicle 18 may include a motor, a powertrain, or other type of propulsion system 24 operable to convert electrical power provided from the battery pack 16 to mechanical power sufficient for use in driving the electric vehicle 18. While the electric vehicle 18 may include fuel cells, generators, and/or other types of onboard regenerative charging systems (not shown) to facilitate charging the battery pack 16, the present disclosure is predominately described with respect to use of the OBCM 12 charging the battery pack 16 using electrical power provided from a variety of the offboard charging systems 22. The use of the OBCM 12 to charge the battery pack 16 with electrical power provided from the various offboard charging systems 22 may be beneficial when the electric vehicle 18 lacks onboard regenerative charging devices and/or the vehicle operator prefers charging the battery pack 16 without relying on onboard regenerative devices. It may also be more cost effective or quicker to charge the battery pack 16 using offboard charging systems 22 or it may be a necessity due to an onboard regenerative charging system being out of fuel or otherwise unable to meet battery pack charging demands.

Recognizing the need to provide offboard charging, a wide variety of vendors, utility providers, etc. have developed broadly differing types and configurations of the offboard charging systems 22 according to a wide variety of configurations and formats, including supplying the electrical power as a direct current (DC), single-phase alternating current (AC), and/or three-phase AC input. The offboard charging systems 22 are illustrated as being static infrastructures, however, some offboard charging systems 22 may be mobile, including some offboard charging systems 22 being included onboard other vehicles or devices, e.g., another electric vehicle may be considered as an offboard charging system 22, as one skilled in the art will appreciate, when its charging system is used to provide electrical supply electrical power to the OBCM 12 for purposes of charging the battery pack 16. The present disclosure, accordingly, contemplates the offboard charging systems 22 to include every type of electrical power supply capable of providing electrical power usable with the OBCM 12.

The offboard charging systems 22 may be individually considered for purposes of the present disclosure as a device offboard of the electric vehicle 18 capable of supplying electrical power to the OBCM 12 to facilitate charging the battery pack 16. The OBCM 12, however, as described below in more detail, may include a bi-directional configuration, with the OBCM 12 may being configured to receive a supply of electrical power from the offboard charging systems 22 for charging the battery pack 16 while also being configured to provide a supply electrical power from the battery pack 16 to the offboard charging systems 22 or another device. The present disclosure, as such, contemplates its use and application, and more specifically the use and application of the OBCM 12, with various types of charging activities, including vehicle-to-vehicle (V2V) direct-current fast charging (DCFC), AC level 1, 2, or 3 charging, vehicle-to-grid (V2G), vehicle to an externally connected electrical load (vehicle-to-load, or V2L), vehicle-to-grid (V2G), etc., which may be collectively referred to as vehicle-to-anything (V2X).

Figure 2:
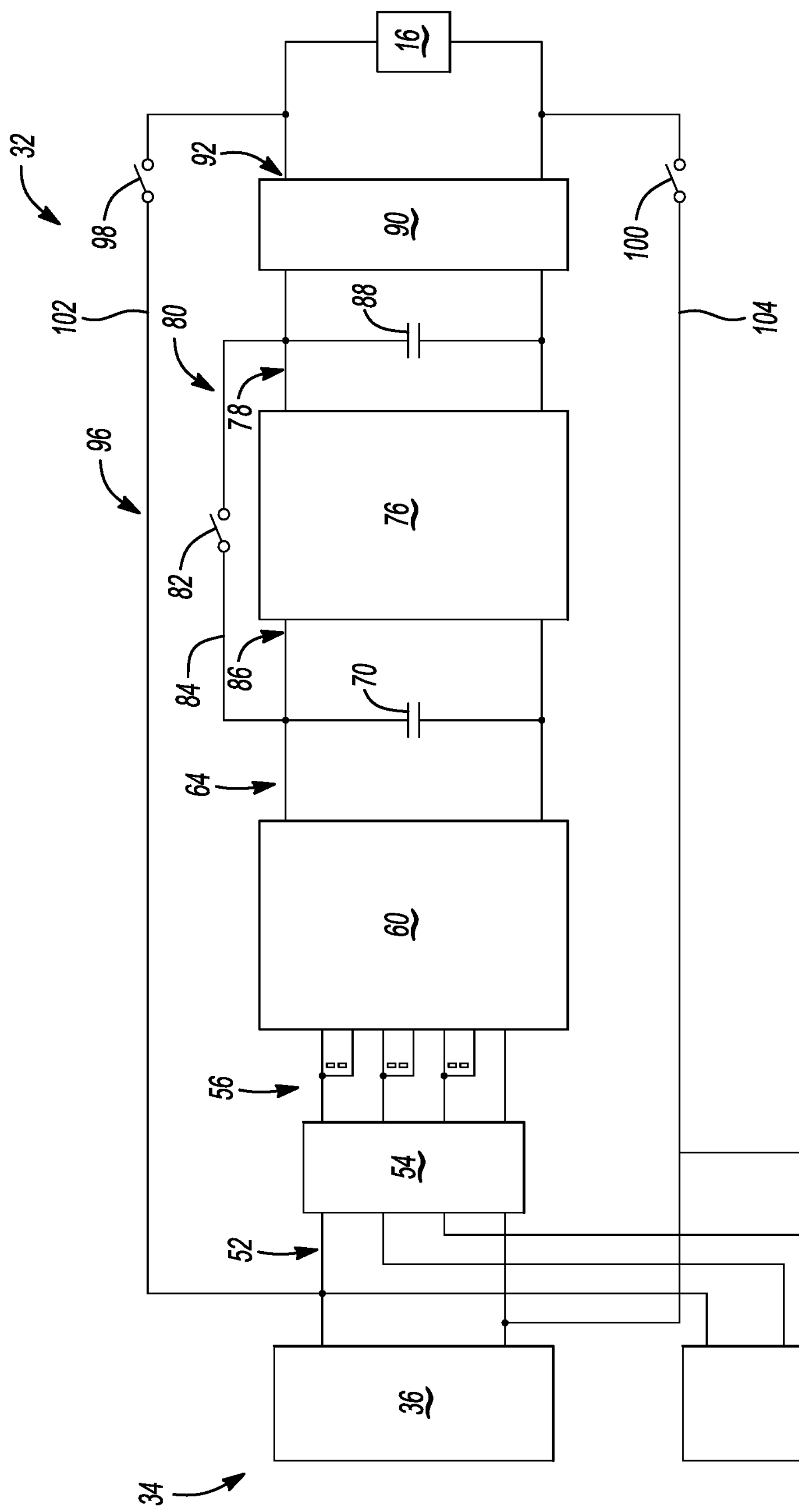
FIG. 2 illustrates a schematic diagram of the OBCM in accordance with one non-limiting aspect of the present disclosure.

FIG. 2 illustrates a schematic diagram 32 of the OBCM 12 in accordance with one non-limiting aspect of the present disclosure. The OBCM 12 may include an electrical connector 34 for electrically interfacing with the offboard charging systems 22, including a DC connection 36 for connecting to an DC output of a DC, offboard charging system 22 and an AC connection 38 for connecting to an AC output of an AC, offboard charging system 22. The electrical connection 34 may be operable with a DC receptacle 40 (see FIG. 1) configured to couple with a connector 42 associated with a charging cable 44 of an offboard charging system 22 supplying DC power and an AC receptacle 48 operable to couple with the connector 42 of an offboard charging system 22 supplying AC power, with the AC receptacle 48 being configured to support single-phase and three-phase AC. The illustrated configurations of the DC and AC connections 36, 38 are presented for exemplary purposes as the present disclosure fully contemplates other connection methodologies being employed, including the use of a single DC or AC connection 36, 38, optionally with the AC connection 38 supporting one of single-phase or three-phase AC, as opposed to the illustrated configured for simultaneously supporting both of single-phase and three-phase AC.

A supply of electrical power from one of the offboard charging systems 22 may be delivered via one of the DC or AC connections 36, 38 to act as a charging input 52 to the OBCM 12. An input filter 54 may optionally be included and configured to mitigate noise within the charging input 52, with a filter output 56 thereof interfacing the charging input 52 with a boost converter 60. The boost converter 60 may be configured to boost the charging input 52 to a boosted output 64 sufficient for charging the battery pack 16. One or more capacitors 70 may be included to smooth the boosted output 64. An isolation converter 76 may be configured to electrically isolate the boost converter 60 from the battery pack 16 and to transform the boosted output 64 to an isolated output 78 sufficient for charging the battery pack 16. An isolation bypass circuit 80 having an isolation relay 82 disposed within an isolation connection 84 may be configured to selectively bypass the isolated converter 76. The isolation relay 82 may be controllable between opened and closed states, with the closed state corresponding with an isolation bypass state where the boosted output 64 bypasses the isolated converter 76 and the opened state corresponding with an isolation connect state where the boosted output 64 is connected to an isolation input 86 of the isolation converter 76. One or more capacitors 88 may be included to smooth the isolated output 78.

An output filter 90 may optionally be included and configured to mitigate noise within one of the boosted and isolated outputs 64, 78, depending on whether the isolation bypass circuit 80 is in the isolation bypass state or the isolation connect state, with a filter output 92 thereof interfacing the one of the boosted and isolated outputs 64, 78 with the battery pack 16. A battery bypass circuit 96 having a plurality of battery relays 98, 100 and a plurality of separate conductors 102, 104 may be included to selectively bypass the filters 54, 90 and the boost and isolation converters 60, 76 to provide a direct connection between the DC connection 36 and the battery pack 16, i.e., to provide a direct connection between a supply of DC electrical power and the battery pack 16, such as to provide DCFC. The battery relays 98, 100 may be collectively controllable between opened and closed states, with a battery connect state corresponding with the battery relays 98, 100 being in the closed state and a battery disconnect state corresponding with the battery relays 98, 100 being in the opened state. As shown in FIG. 1, a charging controller 106 may be included to facilitate controlling the isolation and battery relays 82, 98, 100 and directing operations of the OBCM 12 to facilitate bidirectional charging and discharging of the battery pack 16.

Figure 3:
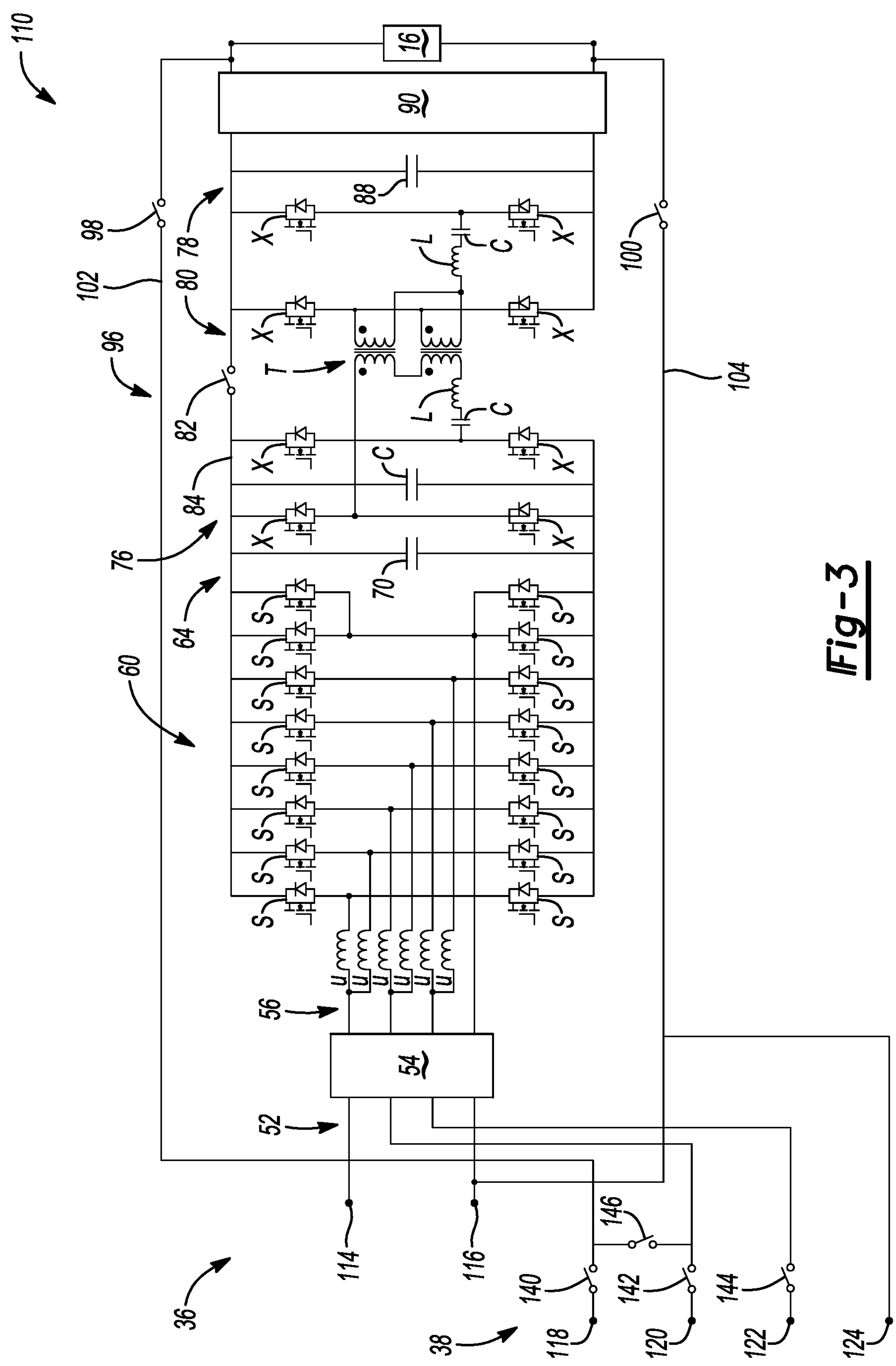
FIG. 3 illustrates a component diagram of the OBCM in accordance with one non-limiting aspect of the present disclosure.

FIG. 3 illustrates a component diagram 110 of the OBCM 12 in accordance with one non-limiting aspect of the present disclosure. The DC connection 36 may include a plurality of DC inputs 114, 116 selectively coupled with the boost converter 60 by way of the first filter 54. The AC connection 38 may include a plurality of AC inputs 118, 120, 122, 124 selectively coupled with a plurality of input relays 140, 142, 144, 146, to the boost converter 60 by way of the first filter 54. The charging controller 106 may be configured to detect a type of electrical power being supplied by a connected to one of the offboard charging systems 22, and based thereon, to selectively actuate the input relays 140, 142, 144, 146 between an opened/off state and a closed/on state. The input and output filters 54, 90 may be configured as electromagnetic interference (EMI) filters. The boost converter 60 may include a plurality of boost switches S and a plurality of boost inductors U arranged in a multi-phase, totem-pole power factor correction (PFC) configuration. The isolation converter 76 may include a plurality of isolation switches X, a plurality of isolation inductors L, and a transformer T arranged in a CLLLC converter configuration.

The present disclosure fully contemplates the boost and isolation converters 60, 76 having other configurations sufficient to facilitate the operations contemplated herein, and the OBCM 12 optionally including more or less of the illustrated components, e.g., omitting the input and/or output filters 54, 90 and/or having other configurations for the input relays 140, 142, 144, 146. The relays 82, 98, 100, 140, 142, 144, 146 may be mechanical relays, solid-state relays, or other types of relays capable of being actuated between opened/on and closed/on states, e.g., between conducting and non-conducting states, according to signals, instructions, voltages, etc. issued by or in cooperation with the charging controller 106. The switches S, X may be metal-oxide-semiconductor field-effect transistors (MOSFETs) or the like capable of being controlled between opened/on and closed/on states according to signals, instructions, voltages, etc. issued by or in cooperation with the charging controller 106. The charging controller 106 may include a pulse width modulation (PWM) controller and/or a corresponding plurality of non-transitory instructions stored on an associated computer readable storage medium, which when executed with a processor, may be sufficient to facilitate controlling the OBCM 12 as described herein, including controlling the relays 82, 98, 100, 140, 142, 144, 146 and switches S, X between the opened and closed states and controlling a switching frequency and a duty cycle of the switches S, X to facilitate manipulating the supply of electrical power in the manner contemplated herein.

Figure 4:
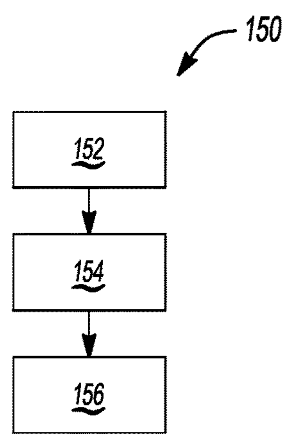
FIG. 4 illustrates a flowchart of a method for multifunction onboard battery charging in accordance with one non-limiting aspect of the present disclosure.

FIG. 4 illustrates a flowchart 150 of a method for multi-function onboard battery charging in accordance with one non-limiting aspect of the present disclosure. The method is predominately described with respect to using the OBCM 12 to charge the battery pack 16, however, as noted above, the present disclosure fully contemplates controlling the OBCM 12 to facilitate bi-directional activities whereby the OBCM 12 may be used to charge an offboard device, i.e., instead of receiving electrical power from an awkward charging system 22, the OBCM 12 may provide electrical power thereto. One non-limiting aspect of the present disclosure contemplates the battery pack 16 being a high-voltage type of battery pack, such as one operating at 800V DC, with the offboard charging systems being configured to provide electrical power at 800V DC, 400V DC (or other lower DC voltage), 85-265V single-phase AC, and/or 170-265V three-phase AC. These electrical power levels and types, however, are presented for exemplary purposes as illustrated of levels and types commonly used with electric vehicles as the multi-function capabilities of the OBCM 12 enable the OBCM 12 to support a wider range of electrical power transfers beyond the specific values noted above.

Block 152 relates to determining a connection type between the OBCM 12 and the off or charging system 22, such as by the controller 106 interrogating the offboard charging system 22 to determine a type of electrical power to be provided therefrom. Block 154 relates to correspondingly selecting or setting the states for each of the relays 82, 98, 100, 140, 142, 144, 146, i.e., selectively turning on/closed and off/open each of the relays. The table shown below illustrates exemplary states for each of the relays 82, 98, 100, 140, 142, 144, 146 according to the representative electrical power supplies.

| Charging Input | Relay | State |
|---|---|---|
| 800 V DC | 82 | Off |
| | 98 | On |
| | 100 | On |
| | 140 | Off |
| | 142 | Off |
| | 144 | Off |
| | 146 | Off |
| 400 V DC | 82 | On |
| | 98 | Off |
| | 100 | On |
| | 140 | Off |
| | 142 | Off |
| | 144 | Off |
| | 146 | On |
| 85-265 V AC Single-Phase | 82 | Off |
| | 98 | Off |
| | 100 | Off |
| | 140 | On |
| | 142 | Off |
| | 144 | Off |
| | 146 | On |
| 170-265 V AC Three-Phase | 82 | Off |
| | 98 | Off |
| | 100 | Off |
| | 140 | On |
| | 142 | On |
| | 144 | On |
| | 146 | Off |

Block 156 relates to controlling flow of electrical power through the OBCM 12, such as from one of the offboard charging system 22 to the battery pack 16. With the exception of controlling each of the switches S, X to the off/opened state when the direct connection is provided between the offboard charging system 22 and the battery pack 16, i.e., when the offboard charging system 22 can directly provide the high voltage (e.g., 800V DC) utilized by the battery pack, each of the switches S, X, may be controlled according to PWM signaling, i.e., a switching frequency and a duty cycle for each of the switches S, X may be set to facilitate providing the battery pack with the 800V DC, with each of the switches S, X being controlled differently depending on the charging input. By way of example, the switches S of the boost converter 60, may be subjected to the PWM control such that the boosted output 64 corresponds with the desired charging voltage for the battery pack 16, i.e., 800V DC. The switches X of the isolation converter 76 may be subjected to the PD opium control such that the boosted output 64 is transformed and isolated from the isolation output 78.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A multi-function onboard battery charger module (OBCM) for charging a battery pack with electrical power sourced from a plurality of offboard charging systems, the battery pack configured to provide electrical power to a motor of an electric vehicle, the motor converting the electrical power to mechanical power used to drive the electric vehicle, the OBCM comprising:

a boost converter operable to boost a charging input to a boosted output, the boosted output operable for charging the battery pack;

an isolation converter operable to electrically isolate the boost converter from the battery pack and to transform the boosted output to an isolated output, the isolated output operable for charging the battery pack;

an output filter operable to mitigate noise within one of the boosted output and the isolated output, a filter output of the output filter interfacing the one of the boosted output and the isolated output with the battery pack;

an isolation bypass circuit operable between an isolation bypass state and an isolation connect state, the isolation bypass state connecting the boosted output to a filter input of the output filter in bypass of the isolation converter, the isolation connect state connecting the boosted output to an isolation input of the isolation converter; and a battery bypass circuit operable between a battery connect state and a battery disconnect state, the battery connect state connecting the charging input through a direct connection to the battery pack in bypass of the boost and isolation converters, the battery disconnect state disconnecting the direct connection.

2. The OBCM according to claim 1, wherein the boost converter is operable to generate the boosted output as a high voltage direct current (DC) output when the charging input is either of a lower voltage DC input lower than the high voltage DC output, a single-phase alternating current (AC) input, and a three-phase AC input.

3. The OBCM according to claim 2, wherein the boost converter is configured to generate the high voltage DC output at 800V when the lower voltage DC input is 400V, the single-phase AC input is between 85-265V, and the three-phase AC input is between 170-265V.

4. The OBCM according to claim 1, wherein the isolation bypass circuit includes a relay within an isolation connection between and the boosted output and the filter input, the isolation bypass state occurring when the relay is in a closed state, the isolation connect state occurring when the relay is in an opened state.

5. The OBCM according to claim 1, wherein the battery bypass circuit includes a relay in between a connection input and a connection output of the direct connection, the battery connect state occurring when the relay is in a closed state, the battery disconnect state occurring when the relay is in an opened state.

6. The OBCM according to claim 1, wherein the boost converter includes a plurality of switches and any plurality of inductors arranged in a multi-phase, totem-pole power factor correction (PFC) configuration.

7. The OBCM according to claim 6, further comprising a pulse width modulation (PWM) controller operable to set a switching frequency and a duty cycle for each of the switches to control boosting of the charging input to the boosted output.

8. The OBCM according to claim 1, wherein the isolation converter includes a plurality of switches and any plurality of inductors arranged in a CLLLC converter configuration.

9. The OBCM according to claim 8, further comprising a pulse width modulation (PWM) controller operable to set a switching frequency and a duty cycle for each of the switches to control transforming of the boosted output to the isolated output.

10. The OBCM according to claim 1, further comprising an input filter operable to mitigate noise within the charging input, a filter output of the input filter interfacing the charging input with the boost converter.

11. The OBCM according to claim 10, further comprising an electrical connector configured to electrically interface the input filter and the battery bypass circuit with the offboard charging systems.

12. The OBCM according to claim 11, wherein the electrical connector includes a direct current (DC) connection configured for electrically connecting to a direct current (DC) charging system of the offboard charging systems.

13. The OBCM according to claim 12, wherein the electrical connector includes an alternating current (AC) connection configured for electrically connecting to a single-phase AC charging system and a three-phase AC charging system of the offboard charging systems.

14. The OBCM according to claim 13, wherein the AC connection includes a plurality of electrical inputs and a plurality of switches, the switches being individually operable between opened and closed positions to selectively connect the inputs to the input filter depending on whether the AC connection electrically connects with the single-phase AC charging system or the three-phase AC charging system.

15. A multi-function onboard battery charger module (OBCM) for charging a battery pack with electrical power sourced from a plurality of offboard charging systems, comprising:

an electrical connector having a direct current (DC) connection configured for electrically connecting to a direct current (DC) charging system of the offboard charging systems and an alternating current (AC) connection configured for electrically connecting to a single-phase AC charging system and a three-phase AC charging system of the offboard charging systems;

a boost converter operable to boost a charging input to a boosted output, the boosted output operable for charging the battery pack;

an isolation converter operable to electrically isolate the boost converter from the battery pack and to transform the boosted output to an isolated output, the isolated output operable for charging the battery pack;

an output filter operable to mitigate noise within one of the boosted output and the isolated output, a filter output of the output filter interfacing the one of the boosted output and the isolated output with the battery pack;

an isolation bypass circuit operable between an isolation bypass state and an isolation connect state, the isolation bypass state connecting the boosted output to a filter input of the output filter in bypass of the isolation converter, the isolation connect state connecting the boosted output to an isolation input of the isolation converter; and a battery bypass circuit operable between a battery connect state and a battery disconnect state, the battery connect state connecting the charging input through a direct connection to the battery pack in bypass of the boost and isolation converters, the battery disconnect state disconnecting the direct connection.

16. The OBCM according to claim 15, wherein the AC connection includes a plurality of electrical inputs and a plurality of switches, the switches being individually operable between opened and closed positions to selectively connect the inputs to the charging input depending on whether the AC connection electrically connects with the single-phase AC charging system or the three-phase AC charging system.

17. The OBCM according to claim 16, wherein:

the boost converter includes a plurality of switches and any plurality of boost inductors arranged in a multi-phase, totem-pole power factor correction (PFC) configuration;

the isolation converter includes a plurality of switches and any plurality of inductors arranged in a CLLLC converter configuration; and a pulse width modulation (PWM) controller operable to set a switching frequency and a duty cycle for each of the switches of the boost and isolation converters to control boosting and transforming of the charging input.

18. A multi-function onboard battery charger module (OBCM), comprising:

a boost converter operable to boost a charging input to a boosted output;

an isolation converter operable to electrically isolate the boost converter from the battery pack and to transform the boosted output to an isolated output;

an output filter operable to mitigate noise within an output resulting from one of the boosted output and the isolated output;

an isolation bypass circuit operable between an isolation bypass state and an isolation connect state, the isolation bypass state connecting the boosted output to a filter input of the output filter in bypass of the isolation converter, the isolation connect state connecting the boosted output to an isolation input of the isolation converter; and a battery bypass circuit operable between a connect state and a disconnect state, the connect state connecting the charging input through a direct connection to an output in bypass of the boost and isolation converters, the disconnect state disconnecting the direct connection.

19. The OBCM according to claim 18, wherein the boost converter is operable to generate the boosted output as a high voltage direct current (DC) output when the charging input is either of a lower voltage DC input lower than the high voltage DC output, a single-phase alternating current (AC) input, and a three-phase AC input.

20. The OBCM according to claim 19, wherein the boost converter is configured to generate the high voltage DC output at 800V when the lower voltage DC input is 400V, the single-phase AC input is between 85-265V, and the three-phase AC input is between 170-265V.

* * * * *